3,525,740
5',6'-DIHYDRO-2H-PYRAN-4'-YL ETHERS OF
ANABOLIC STEROIDS
Alexander D. Cross, Mexico City, Mexico, and John A.
Edwards, Los Altos, Calif., assignors to Syntex Corporation, Panama, Panama, a corporation of Panama
No Drawing. Continuation-in-part of application Ser. No.
731,300, May 22, 1968. This application Oct. 9, 1968,
Ser. No. 766,321
Int. Cl. C07c 173/00
U.S. Cl. 260—239.55                    36 Claims

ABSTRACT OF THE DISCLOSURE

The 5',6'-dihydro-2H-pyran-4'-yl ethers of anabolic steroids have high oral activities.

---

This is a continuation-in-part of U.S. Pat. application Ser. No. 731,000 filed May 22, 1968.

This invention relates to novel and useful 5',6'-dihydro-2H-pyran-4'-yl ethers of anabolic steroids, the steroid nucleus thus bearing a new group represented by the formula:

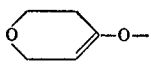

In the preferred embodiment, this new group is added at the C-3, C-17β or C-3,17β positions of the steroid nucleus.

The preferred anabolic steroidal ethers of this invention have the formulas:

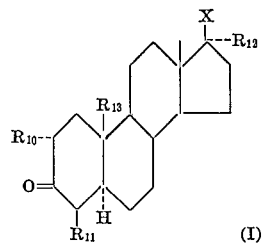
(I)

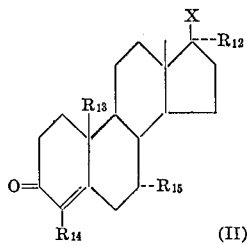
(II)

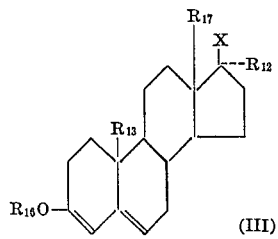
(III)

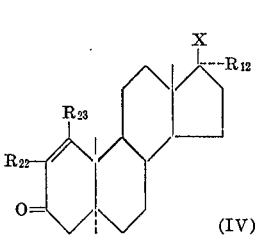
(IV)

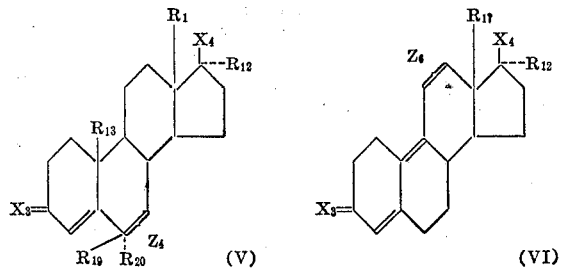

wherein:

$R_{10}$, $R_{11}$, $R_{13}$, $R_{15}$, $R_{22}$, and $R_{23}$ each is hydrogen or methyl (preferably one of $R_{22}$ and $R_{23}$ is methyl);
$R_{12}$ is hydrogen or lower alkyl;
$R_{14}$ is hydrogen or chloro;
$R_{16}$ is lower alkyl or lower cycloalkyl;
$R_{17}$ is methyl or ethyl;
$R_{19}$, $R_{20}$, and $R_{25}$ each is hydrogen, methyl, fluoro, or chloro; and $R_{20}$ is not present when $Z_4$ is a double bond;
X is 5',6'-dihydro-2H-pyran-4'-yloxy;
$X_3$ is keto or α-hydrogen together with β-X, β-hydrogen, or β-hydroxy, and conventional hydrolyzable esters thereof;
$X_4$ is X, hydroxy, or conventional hydrolyzable esters thereof; and at least one of $X_3$ and $X_4$ is X; and
$Z_4$ and $Z_6$ each is a single bond or double bond.

The term "anabolic steroids" is used herein to denote androstanes and 19-norandrostanes having anabolic activity. The preferred anabolic steroids have 5',6'-dihydro-2H-pyran-4'-yloxy groups at positions C-3β, C-17β, or C-3β,17β of the steroid nucleus.

The compounds represented by Formulas I–VI are anabolic agents with a favorable anabolic:androgenic ratio, also possess anti-estrogenic, anti-gonadotrophic, and anti-fibrillatory activities, and can be used in the same manner as testosterone. These compounds are administered by the usual routes, whether orally or parenterally, either alone or in conjunction with other medicinal agents, or in pharmaceutically acceptable, non-toxic compositions formed by the incorporation of any of the normally employed excipients.

The terms "(lower)alkyl" and derivations thereof appearing in the above definitions and elsewhere in the instant specification denote alkyl groups containing from one to six carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed in the steroid art, preferably those hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, perlargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2-chloro-4-nitrobenzoate, aminoacetate, diethylaminoacetate, piperidinoacetate, $\beta$-chloropropionate, trichloroacetate, $\beta$-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenyl phosphate, sodium o-methoxyphenyl phosphate, cyclohexylammonium p-cyanobenzyl phosphate, sodium phenacyl phosphate, benzyl o-carbomethoxyphenyl phosphate, and the like.

By the term "aryl" are included aryl, aralkyl, and alkaryl groups, such as phenyl, p-chlorophenyl, p-methoxyphenyl, benzyl, phenethyl, tolyl, ethylphenyl, and the like. The wavy line ($\xi$) designates and includes both the alpha and beta configurations.

The novel 17$\beta$-(5′,6′-dihydro-2H-pyran-4′-yloxy) ethers of Formulas I, II, III, and IV can be prepared from the corresponding 17$\beta$-hydroxy compounds by a process which can be illustrated schematically as follows:

In these formulas, $R_{10}$, $R_{11}$, $R_{12}$, $R_{13}$, $R_{14}$, $R_{15}$, $R_{16}$, $R_{17}$, $R_{22}$, $R_{23}$, and X have the meanings given above with respect to Formulas I–IV.

In carrying out the above illustrated process, the 17$\beta$-hydroxy compounds (I′, II′, III′, and IV′) are reacted under substantially anhydrous conditions with an excess of 4′-(lower)alkoxy-5′,6′-dihydro-2H-pyran, preferably 4′-methoxy-5′-6′-dihydro-2H-pyran. The hydroxy compounds are reacted, for example, with from about two to about 50 or more molecular equivalents for each hydroxyl group in the steroid starting material, in the presence of a small amount of an acidic catalyst, such as hydrochloric acid, p-toluenesulfonic acid, boron trichloride etherate, and the like, either alone or together with an inert, organic solvent, such as benzene, diethyl ether, methylene chloride, or the like, at a temperature ranging from about 0° C. to about 80° C. (preferably at around room temperature, i.e., 25° C.) for about five minutes to about 48 hours, thus giving the corresponding 17$\beta$-(5′,6′-dihydro-2H-pyran-4′-yl) ethers represented by Formulas I–IV. In carrying out this reaction, a second series of ethers corresponding to those represented by the formulas but wherein X is 4′-methoxytetrahydropyran-4′-yloxy are also formed. Use of hydrocarbon solvents for the reaction medium, higher catalyst concentrations, and longer reaction times increase the yield of the 5′,6′-dihydro-2H-pyran-4′-yloxy compounds.

The 3-, 17$\beta$-, and 3,17$\beta$-bis(5′,6′-dihydro-2H-pyran-4′-yl) ethers represented by Formulas V and VI can be prepared from the corresponding androst-4-en-17$\beta$-ol-3-one and 19-norandrost-4-en-17$\beta$-ol-3-one compounds by a process which can be illustrated schematically as follows:

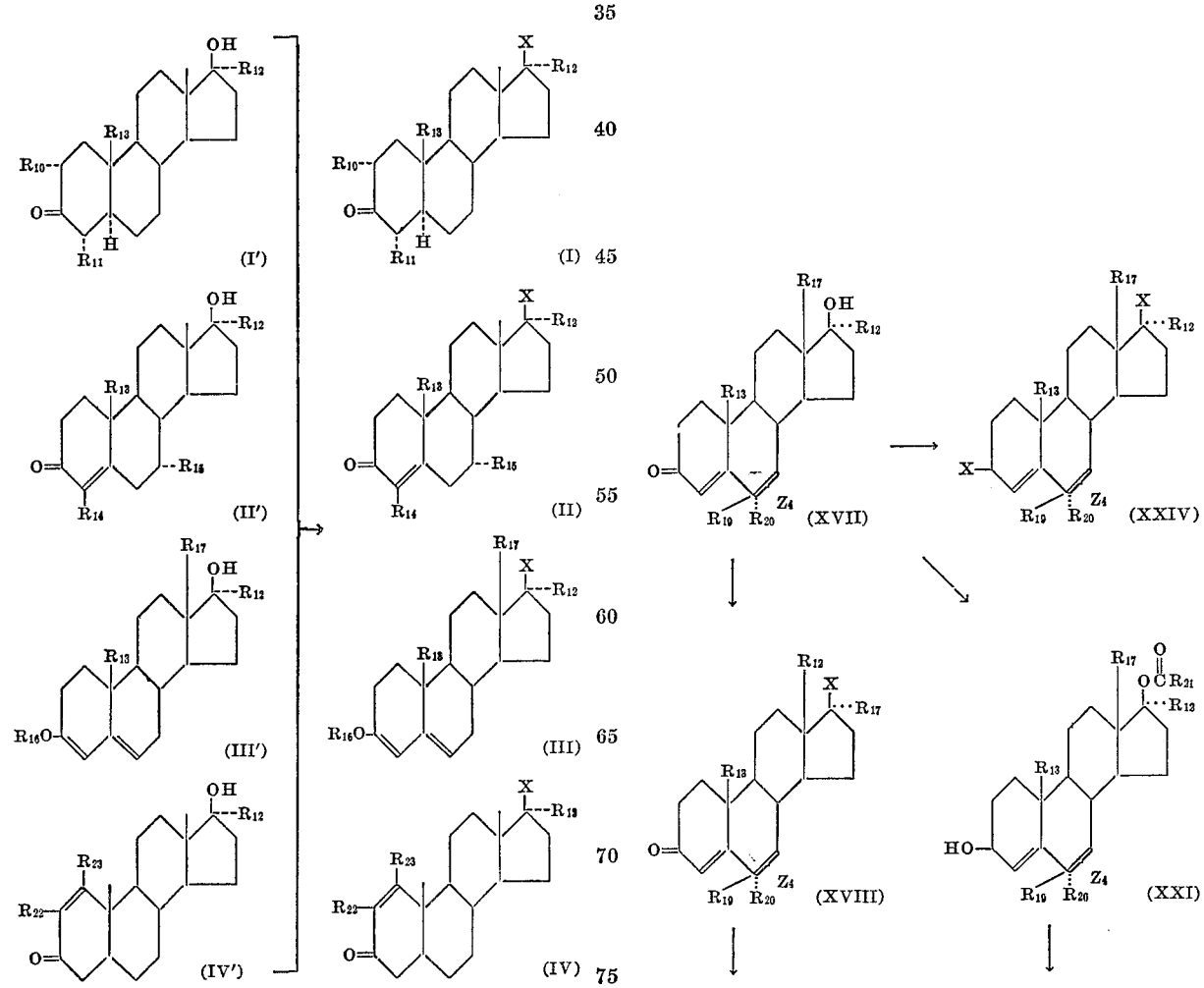

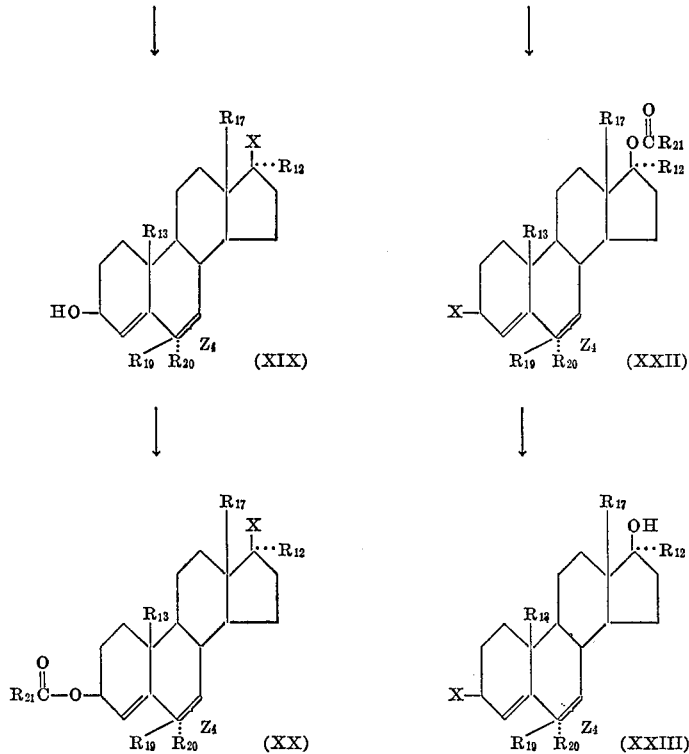

In these formulas, $R_{12}$, $R_{13}$, $R_{17}$, $R_{19}$, $R_{20}$, X, and $Z_4$ have the meanings given with respect to Formulas V and VI above, and $R_{21}$ is an alkyl, alkenyl, cycloalkenyl, or cycloalkyl group having up to 12 carbon atoms.

In carrying out the above-illustrated process, 17α-methylandrost-4-en-17β-ol-3-one, for example, (XVII: $R_{19}$ and $R_{20}$=hydrogen; $R_{12}$, $R_{13}$, and $R_{17}$=methyl) is reacted under substantially anhydrous conditions with an excess of 4′-(lower)alkoxy-5′,6′-dihydro-2H-pyran, preferably 4′-methoxy-5′,6′-dihydro-2H-pyran, as described above with respect to Formulas I–IV to give the corresponding 17α - methyl - 17β - (5′,6′-dihydro-2H-pyran-4′-yloxy)-androst-4-en-3-one (XVIII). This compound can be converted to the 3β-hydroxy derivative by dissolving it in an inert solvent such as a (lower)alkanol, such as methanol, and ether, such as dioxane or tetrahydrofurane or the like, and reacting it under neutral conditions with a metal hydride, such as lithium tri-t-butoxy aluminum hydride, at temperatures ranging from room temperature to reflux temperature for from about one hour to about 24 hours, thus giving the corresponding 17α-methyl-17β-(5′,6′ - dihydro - 2H - pyran - 4′-yloxy)androse-4-en-3β-ol (XIX). To obtain the 3β-ester of Formula XX, the product can be reacted with an organic acid anhydride in pyridine or with a solution of ethyl-magnesium bromide and the desired organic chloride in anhydrous ether; for example, reaction with acetic anhydride yields 3β-acetoxy-17α - methyl - 17β - (5′,6′-dihydro-2H-pyran-4′-yloxy)androst-4-ene (XX: $R_{21}$=methyl). By this procedure, the compounds represented by Formulas XVIII–XX are obtained with other androst-4-en-17β-ol-3-ones wherein $R_{12}$ is hydrogen or lower alkyl; $R_{13}$ is hydrogen or methyl; $R_{17}$ is ethyl or methyl; and $R_{19}$ and $R_{20}$ each is hydrogen, methyl, fluoro, or chloro.

In carrying out the above-illustrated proces to form the 3β-(5′,6′-dihydro-2H-pyran-4′-yl) ethers of Formulas XII and XXIII from the compounds represented by Formula XVII, the keto group at C–3 is first reduced to 3β-hydroxy such as by reaction with lithium tri-t-butoxy aluminum hydride as described above with respect to Formula XIX to yield, for example, 17α-methylandrost-4-ene-3β,17β-diol. The product is then esterified with one molar equivalent of acetic anhydride by procedures described with respect to Formula XX to form a mixture of mono-esters. The 17β-acetoxy compounds are separated from the mixture by conventional chromatographic techniques. For example, 17α-methylandrost-4-en-17β-ol-3-one (XVII: $R_{12}$, $R_{13}$, and $R_{17}$=methyl; $R_{19}$ and $R_{20}$=hydrogen) is reduced to 17α-methylandrost-4-ene-3β,17β-diol and the product is esterified to form 17α-methyl-17β-acetoxyandrost-4-en-3β-ol (XXI). This compound is then reacted with 4′-(lower)-alkoxy-5′,6′-dihydro-2H-pyran as described above with respect to Formula XVIII to yield the corresponding 3β - ether, for example, 3β - (5′,6′ - dihydro-2H-pyran-4′-yloxy) - 17α-methyl-17β-acetoxyandrost-4-ene (XXII). If the 17β-hydroxy compound as described in Formula XXIII is desired, the latter product is hydrolyzed by conventional procedures, for example, in a solution of potassium hydroxide in methanol, to yield the desired product, for example, 3β - (5′,6′ - dihydro-2H-pyran-4′-yloxy)-17α-methylandrost - 4 - en-17β-ol. By this procedure other 3β-(5′,6′-dihydro-2H-pyran-4′-yloxy) compounds represented by Formulas XXII and XXIII can be prepared from the corresponding compounds of Formula XVII wherein $R_{12}$ is hydrogen or lower alkyl; $R_{13}$ is hydrogen or methyl; $R_{17}$ is methyl or ethyl; and $R_{19}$ and $R_{20}$ each is hydrogen, methyl, fluoro, or chloro.

In the above-illustrated processes to make the $3\beta,17\beta$-bis - (5',6'-dihydro-2H-pyran-4'-yloxy) ethers represented by Formula XXIV, the corresponding $17\beta$-hydroxy-3-keto of Formula XVII is first reduced by reaction with a metal hydride, such as lithium tri-t-butoxy aluminum hydride, to yield the corresponding $3\beta$-hydroxy compound as described above with respect to the compounds of Formula XIX. The $3\beta,17\beta$-dihydroxy compound, for example, $17\alpha$-methylandrost-4-ene-$3\beta,17\beta$-diol, is then reacted with a molar excess of 4'-(lower)alkoxy-5',6'-dihydro-2H-pyran as described above with respect to Formula XVIII to yield the corresponding $3\beta,17\beta$ - bis(5',6'-dihydro-2H-pyran-4'-yloxy) ether, such as, for example, $3\beta,17\beta$-bis(5',6'-dihydro - 2H - pyran-4'-yloxy)-$17\alpha$-methylandrost-4-ene. By this procedure, other compounds represented by Formula XXIV, wherein $R_{12}$, $R_{13}$, $R_{17}$, $R_{19}$, $R_{20}$, and X are as defined above, can be obtained from the corresponding substituted compounds represented by Formula XVII.

By the above-illustrated procedures, the $3\beta$-, $17\beta$-, and $3,17\beta$ - bis(5',6' - dihydro - 2H-pyran-4'-yloxy)-19-norandrosta-4,9(10)-dienes represented by Formula VI can be prepared from the corresponding 19-norandrosta-4,9(10)-dien-$17\beta$-ol-3-ones.

The 4'-(lower)alkoxy-5',6'-dihydro-2H-pyran reactants used to form the ethers of this invention can be prepared by well-known methods. For example, tetrahydro-4-pyrone can be reacted with a primary or secondary lower alkanol under acidic conditions to form the intermediate, 4',4'-di-(lower)alkoxytetrahydropyran, which upon distillation with an acid, such as toluenesulfonic acid or mestylenesulfonic acid, yields the 4'-(lower)alkoxy-5',6'-dihydro-2H-pyran product. Such a method is described by Reese et al., J. Am. Chem. Soc. 89, 3367 (1967). The lower alkanol is preferably methanol but it can be other lower alcohols, such as ethanol, propanol, isopropanol, butanol, isobutanol, pentanol, amyl alcohol, hexanol, and the like, to form the corresponding pyrans, such as, for example, 4' - methoxy-5',6'-dihydro-2H-pyran, 4'-ethoxy-5',6'-dihydro-2H-pyran, etc.

The ethers of Formula I are prepared from known 19-norandrostan - 17 - ol - 3-ones and androstan-17-ol-3-ones containing the substituents represented by $R_{10}$, $R_{11}$, $R_{12}$, and $R_{13}$. See, for example, JACS 81, 428 (1959); JACS 76, 5024 (1954); and U.S. Pats. 2,756,244 and 2,844,602.

In preparing the ethers of Formula II, the substituents $R_{12}$, $R_{13}$, $R_{14}$, and $R_{15}$ are likewise present in the known starting steroids. See, for example, Lo Sperimentale 106, 490 (1956); J. Org. Chem. 21, 1432 (1956); JACS 80, 4717 (1959); Lo Sperimentale 104, 490 (1956); Tetrahedron 3, 14 (1958); JACS 75, 5366 (1953); and U.S. Pats. 3,028,401 and 3,213,986.

In preparing the ethers of Formula III, the substituents $R_{12}$, $R_{13}$, $R_{16}$, and $R_{17}$ are also present in the known starting steroids. See, for example, U.S. Pat. 3,067,214.

In preparing the ethers of Formula IV, the substituents $R_{12}$, $R_{22}$, and $R_{23}$ are present in the known starting compounds and can be obtained from known compounds by conventional techniques. See, for example, Int. Steroid Congress, Milan, p. 68 (1962); JACS 82, 5494 (1960); German Pat. No. 1,096,356; and U.S. Pat. No. 3,361,774.

In preparing the ethers of Formula V, the substituents $R_{12}$, $R_{13}$ $R_{17}$, $R_{19}$, and $R_{20}$ are present in the known starting compounds. See, for example, JACS 80, 4717 (1958); JACS 83 4663 (1961); J. Pharm. Pharmacol 9, 929 (1957); Ber 71, 1024 (1938); Endocrinology 65, 265, and U.S. Pats. 3,028,401, 3,047,592, 3,052693 and 3,067,214.

In preparing the ethers of Formula VI the substituents $R_{12}$ and $R_{17}$ are also present in the known starting compounds. See, for example, JACS 83, 4463 (1961); J. Chem. Soc., 4472 (1964); and U.S. Pat. 3,086,027, 3,248,294 3,250,793, and 3,257,278.

Starting materials having an 18-methyl group ($R_{17}$=ethyl) are obtainable by methods described by Smith et al. in Experimenta, vol. 19, pages 394–396 (1963).

This invention is further illustrated by the following specific but non-limiting examples.

EXAMPLE 1

To a solution of 1 g. of $5\alpha,19$-norandrost-$17\beta$-ol-3-one and 25 cc. of benzene there is added 2 cc. of 4'-methoxy-5',6'-dihydro-2H-pyran. Next, approximately 5 cc. of the mixture of benzene and dihydropyran is distilled off to remove moisture, and the remaining mixture is then cooled to room temperature. To the cooled mixture is then added 0.1 g. of p-toluenesulfonic acid, and the resulting reaction mixture is held at room temperature for 72 hours. Following this reaction period, the reaction mixture is washed with an aqueous 5% sodium carbonate solution and then with water until a neutral pH is obtained, then dried over anhydrous sodium sulfate and evaporated to dryness. The dry residue is then chromatographed by passing it, dissolved in hexane, through a column of neutral alumina, to yield $17\beta$-(5',6'-dihydro-2H-pyran-4'-yloxy)-$5\alpha,19$-norandrost-3-one.

EXAMPLE 2

By repeating the procedure of Example 1 in every detail but one, namely, replacing the $5\alpha$-19-norandrost-$17\beta$-ol-3-one with:

$2\alpha$-methyl-$5\alpha,19$-norandrost-$17\beta$-ol-3-one,
$2\alpha$-methyl-$5\alpha$-androst-$17\beta$-ol-3-one,
$4\alpha$-methyl-$5\alpha,19$-norandrost-$17\beta$-ol-3-one,
$2\alpha,17\alpha$-dimethyl-$5\alpha,19$-norandrost-$17\beta$-ol-3-one,
$4\alpha$-methyl-$17\alpha$-ethyl-$5\alpha$-androst-$17\beta$-ol-3-one, and
$4\alpha$-methyl-$5\alpha$-androst-$17\beta$-ol-3-one—the corresponding
$2\alpha$-methyl-$17\beta$-(5,6'-dihydro-2H-pyran-4'-yloxy)-$5\alpha,19$-norandrost-3-one,
$2\alpha$-methyl-$17\beta$-(5',6'-dihydro-2H-pyran-4'-yloxy)-$5\alpha$-androst-3-one,
$4\alpha$-methyl-$17\beta$-(5',6'-dihydro-2H-pyran-4'-yloxy)-$5\alpha,19$-norandrost-3-one,
$2\alpha,17\alpha$-dimethyl-$17\beta$-(5',6'-dihydro-2H-pyran-4'-yloxy)-$5\alpha,19$-norandrost-3-one,
$4\alpha$-methyl-$17\alpha$-ethyl-$17\beta$-(5',6'-dihydro-2H-pyran-4'-yloxy)-$5\alpha$-androst-3-one, and
$4\alpha$-methyl-$17\beta$-(5',6'-dihydro-2H-pyran-4'-yloxy)-$5\alpha$-androst-3-one ethers are obtained.

EXAMPLE 3

Repeating the procedure of Example 1 in every detail but one, namely, replacing $5\alpha,19$-norandrost-17-ol-3-one with:
androst-4-en-$17\beta$-ol-3-one,
$17\alpha$-methylandrost-4-en-$17\beta$-ol-3-one,
$17\alpha$-ethyl-androst-4-en-$17\beta$-ol-3-one,
$17\alpha$-propylandrost-4-en-$17\beta$-ol-3-one,
$7\alpha$-methylandrost-4-en-$17\beta$-ol-3-one,
4-chloroandrost-4-en-$17\beta$-ol-3-one,
19-norandrost-4-en-17-ol-3-one,
$17\alpha$-methyl-19-norandrost-4-en-17-ol-3-one,
$17\alpha$-ethyl-19-norandrost-4-en-17-ol-3-one,
$17\alpha$-propyl-19-norandrost-4-en-17-ol-3-one,
$7\alpha$-methyl-19-norandrost-4-en-17-ol-3-one,
$7\alpha,17\alpha$-dimethyl-19-norandrost-4-en-$17\beta$-ol-3-one, and
4-chloro-19-norandrost-4-en-17-ol-3-one—the corresponding
$17\beta$-(5',6'-dihydro-2H-pyran-4'-yloxy)androst-4-en-3-ones and
19-norandrost-4-en-3-ones are obtained, e.g.,
$17\beta$-(5',6'-dihydro-2H-pyran-4'-yloxy)androst-4-en-3-one,
$17\alpha$-methyl-$17\beta$-(5',6'-dihydro-2H-pyran-4'-yloxy)androst-4-en-3-one,
$17\alpha$-ethyl-$17\beta$-(5',6'-dihydro-2H-pyran-4'-yloxy)androst-4-en-3-one, 17α-propyl-17β-(5',6'-dihydro-2H-pyran-4'-yloxy)
androst-4-en-3-one,
7α-methyl-17β-(5',6'-dihydro-2H-pyran-4'-yloxy)
androst-4-en-3-one,
4-chloro-17β-(5',6'-dihydro-2H-pyran-4'-yloxy)androst-4-en-3-one,
17β-(5',6'-dihydro-2H-pyran-4'-yloxy)-19-norandrost-4-en-3-one,
17α-methyl-17β-(5',6'-dihydro-2H-pyran-4'-yloxy)-19-norandrost-4-en-3-one, :
17α-ethyl-17β-(5',6'-dihydro-2H-pyran-4'-yloxy)-19-norandrost-4-en-3-one,:
17α-propyl-17β-(5',6'-dihydro-2H-pyran-4'-yloxy)-19-norandrost-4-en-3-one,
7α-methyl-17β-(5',6'-dihydro-2H-pyran-4'-yloxy)-19-norandrost-4-en-3-one:, :
7α,17α-dimethyl-17β-(5',6'-dihydro-2H-pyran-4'-yloxy)-19-norandrost-4-en-3-one, and
4-chloro-17β-(5',6'-dihydro-2H-pyran-4'-yloxy)-19-norandrost-4-en-3-one.

EXAMPLE 4

Repeating the procedure of Example 1 but replacing 5α,19-norandrost-17β-ol-3-one with:

3-methoxy-17α-methylandrosta-3,5-dien-17β-ol,
3-methoxy-17α,18-dimethylandrosta-3,5-dien-17β-ol,
3-propoxy-17α-methylandrosta-3,5-dien-17β-ol,
3-cyclopropoxy-17α-methylandrosta-3,5-dien-17β-ol,
3-ethoxy-17α-methylandrosta-3,5-dien-17β-ol,
3-cyclopentoxy-17α-methylandrosta-3,5-dien-17β-ol,
3-cyclobutoxy-17α-methylandrosta-3,5-dien-17β-ol,
3-methoxy-17α-methyl-19-norandrosta-3,5-dien-17β-ol,
3-methoxy-17α,18-dimethyl-19-norandrosta-3,5-dien-17β-ol,
3-methoxy-17α-ethylandrosta-3,5-dien-17β-ol,
3-methoxy-17α-ethyl-19-norandrosta-3,5-dien-17β-ol,
3-cyclopentoxy-19-norandrosta-3,5-dien-17β-ol,
3-cyclopentoxy-18-methyl-19-norandrosta-3,5-dien-17β-ol,
3-cyclopentoxy-17α,18-dimethyl-19-norandrostra-3,5-dien-17β-ol, and
3-ethoxy-17α,18-dimethyl-19-norandrosta-3,5-dien-17β-ol, the following products are obtained:
3-methoxy-17α-methyl-17β-(5',6'-dihydro-2H-pyran-4'-yloxy)-androsta-3,5-diene,
3-methoxy-17α,18-dimethyl-17β-(5',6'-dihydro-2H-pyran-4'-yloxy)androstra-3,5-diene,
3-propoxy-17α-methyl-17β-(5',6'-dihydro-2H-pyran-4'-yloxy)-androsta-3,5-diene,
3-cyclopropoxy-17α-methyl-17β-(5',6'-dihydro-2H-4'-yloxy)androsta-3,5-diene,
3-ethoxy-17α-methyl-17β-(5',6'-dihydro-2H-pyran-4'-yloxy)androsta-3,5-diene,
3-cyclopentoxy-17α-methyl-17β-(5',6'-dihydro-2H-pyran-yloxy)andrösta-3,5-diene,
3-cyclobutoxy-17α-methyl-17β-(5',6'-dihydro-2H-pyran-4'-yloxy)androsta-3,5-diene,
3-methoxy-17α-methyl-17β-(5',6'-dihydro-2H-pyran-4'-yloxy,-19-norandrosta-3,5diene,
3-methoxy-17α,18-dimethyl-17β-(5',6'-dihydro-2H-pyran-4'-yloxy)-19-norandrosta-3,5-diene,
3-methoxy-17α-ethyl-17β-(5',6'-dihydro-2H-pyran-4'-yloxy)androsta-3,5-diene,
3-methoxy-17α-ethyl-17β-(5',6'-dihydro-2H-pyran-4'-yloxy)-19-norandrosta-3,5-diene,
3-cyclopentoxy-17β-(5',6'-dihydro-2H-pyran-4'-yloxy)-19-norandrosta-3,5-diene,
3-cyclopentoxy-17α,18-dimethyl-17β-(5',6'-dihydro-2H-pyran-4'-yloxy)-18-methyl-19-norandrosta-3,5-diene, and
3-ethoxy-17α,18-dimethyl-17β-(5',6'-dihydro-2H-pyran-4'-yloxy)-19-norandrosta-3,5-diene,

EXAMPLE 5

Repeating the procedure of Example 1 but replacing 5α,19-norandrost-17β-ol-3-one with:

3-methyl-5α-androst-1-en-17β-ol-3-one;
1-methyl-5α-androst-1-en-17β-ol-3-one,
1-methyl-17α-methyl-5α-androst-1-en-17β-ol-3-one,
1-methyl-17α-ethyl-5α-androst-1-en-17β-ol-3-one,
2-methyl-5α-androst-1-en-17β-ol-3-one,
2-methyl-17α-methyl-5α-androst-1-en-17β-ol-3-one, and
2-methyl-17α-ethyl-5α-androst-1-en-17β-ol-3-one, the corresponding 17β-ethers are obtained as follows:
1-methyl-17β-(5',6'-dihydro-2H-pyran-4'-yloxy)-5α-androst-1-en-3-one,
1-methyl-17α-methyl-17β-(5',6'-dihydro-2H-pyran-4'-yloxy)-5α-androst-1-en-3-one,
1-methyl-17α-ethyl-17β-(5',6'-dihydro-2H-pyran-4'-yloxy)-5α-androst-1-en-3-one,
2-methyl-17β-(5',6'-dihydro-2H-pyran-4'-yloxy)-5α-androst-1-en-3-one,
2-methyl-17α-methyl-17β-(5',6'-dihydro-2H-pyran-4'-yloxy)-5α-androst-1-en-3-one, and
2-methyl-17α-ethyl-17β-(5',6'-dihydro-2H-pyran-4'-yloxy)-5α-androst-1-en-3-one.

EXAMPLE 6

Repeating the procedure of Example 1 but replacing 5α,19-norandrost-17β-ol-3-one with 19-norandrost-4-en-17β-ol-3-one—17β-(5',6'-dihydro-2H-pyran-4'-yloxy)-19-norandrost-4-en-3-one is obtained.

Similarly, repeating this procedure with other 19-norandrost-4-en-17β-ol-3-ones, androst-4-en-17β-ol-3-ones, 19-norandrosta-4,6-dien-17β-ol-3-ones, and androsta-4,6-17β-ol-3-ones having hydrogen, methyl, chloro, or fluoro groups at the C-6α and/or C-6β position (or at the C-6 position for the 4,6-dienes); hydrogen or methyl at C-18; and hydrogen or lower alkyl (methyl, ethyl, propyl, etc.) at C-17α yields the corresponding 17β-(5',6'-dihydro-2H-pyran-4'-yloxy) compounds, e.g., 17β-(5',6'-dihydro-2H-pyran-4'-yloxy)-18-methylandrost-4-en-3-one,
17α,18-dimethyl-17β-(5',6'-dihydro-2H-pyran-4'-yloxy)androst-4-en-3-one,
6α,17α,18-trimethyl-17β-(5',6'-dihydro-2H-pyran-4'-yloxy)androst-4-en-3-one,
6α,18-dimethyl-17α-ethyl-17β-(5',6'-dihydro-2H-pyran-4'-yloxy)androst-4-en-3-one,
6α,17α-dimethyl-17β-(5',6'-dihydro-2H-pyran-4'-yloxy)androst-4-en-3-one,
6α-methyl-17β-(5',6'-dihydro-2H-pyran-4'-yloxy)androst-4-en-3-one,
17β-(5',6'-dihydro-2H-pyran-4'-yloxy)androst-4-en-3-one,
17β-(5',6'-dihydro-2H-pyran-4'-yloxy)-18-methylandrosta-4,6-dien-3-one,
17α,18-dimethyl-17β-(5',6'-dihydro-2H-pyran-4'-yloxy)-androsta-4,6-dien-3-one,
6α,17α,18-trimethyl-17β-(5',6'-dihydro-2H-pyran-4'-yloxy)androsta-4,6-dien-3-one,
6α,18-dimethyl-17α-ethyl-17β-(5',6'-dihydro-2H-pyran-4'-yloxy)androsta-4,6-dien-3-one,
6α,17α-dimethyl-17β-(5',6'-dihydro-2H-pyran-4'-yloxy)androsta-4,6-dien-3-one,
6α-methyl-17β-(5',6'-dihydro-2H-pyran-4'-yloxy)androsta-4,6-dien-3-one,
17β-(5',6'-dihydro-2H-pyran-4'-yloxy)-18-methyl-19-norandrost-4-en-3-one,
17α,18-dimethyl-17β-(5',6'-dihydro-2H-pyran-4'-yloxy)-19-norandrosta-4-en-3-one,
6α,17α,18-trimethyl-17β-(5',6'-dihydro-2H-pyran-4'-yloxy)-19-norandrost-4-en-3-one,
6α,18-dimethyl-17α-ethyl-17β-(5',6'-dihydro-2H-pyran-4'-yloxy)-19-norandrost-4-en-3-one,
6α,17α-dimethyl-17β-(5',6'-dihydro-2H-pyran-4'-yloxy)-19-norandrost-4-en-3-one, 6α-methyl-17β-(5',6'-dihydro-2H-pyran-4'-yloxy)-19-norandrost-4-en-3-one,
17β-(5',6'-dihydro-2H-pyran-4'-yloxy)19-norandrost-4-en-3-one,
17β-(5',6'-dihydro-2H-pyran-4'-yloxy)-18-methyl-19-norandrosta-4,6-dien-3-one,
17α,18-dimethyl-17β-(5',6'-dihydro-2H-pyran-4'-yloxy)-19-norandrosta-4,6-dien-3-one,
6α,17α,18-trimethyl-17β-(5',6'-dihydro-2H-pyran-4'-yloxy)-19-norandrosta-4,6-dien-3-one,
6α,18-dimethyl-17α-ethyl-17β-(5',6'-dihydro-2H-pyran-4'-yloxy)-19-norandrosta-4,6-dien-3-one,
6α,17α-dimethyl-17β-(5',6'-dihydro-2H-pyran-4'-yloxy)-19-norandrostra-4,6-dien-3-one,
6α-methyl-17β-(5',6'-dihydro-2H-pyran-4'-yloxy)-19-norandrosta-4,6-dien-3-one,
6α-fluoro-17α-methyl-17β-(5',6'-dihydro-2H-pyran-4'-yloxy)-19-norandrost-4-en-3-one,
6α-fluoro-17α,18-dimethyl-17β-(5',6'-dihydro-2H-pyran-4'-yloxy)-19-norandrost-4-ene-3-one, and the like.

EXAMPLE 7

A solution of 1 g. of 17β-(5',6'-dihydro-2H-pyran-4'-yloxy)-19-norandrost-4-ene-3-one in 50 ml. of tetrahydrofuran is added over a 30-minute period to a stirred suspension of 1 g. of lithium tri-t-butoxy aluminum hydride in 50 ml. of anhydrous tetrahydrofuran and this mixture is heated at reflux for two hours. To the mixture are cautiously added 5 ml. of ethylacetate and 2 ml. of water. Sodium sulfate is next added, the mixture is filtered, and the solid thus collected is washed with hot ethylacetate. The combined organic solutions are then evaporated to yield 17β-(5',6'-dihydro-2H-pyran-4'-yloxy)-19 - norandrost-4-en-3β-ol which may be further purified through recrystallization from acetone:hexane.

Similarly, repeating this procedure with other products of Example 6 yields the corresponding 3β-hydroxy derivatives, e.g., 17β-(5',6'-dihydro-2H-pyran-4'-yloxy)-18-methylandrost-4-en-3β-ol,
17α,18-dimethyl-17β-(5',6'-dihydro-2H-pyran-4'-yloxy)-androst-4-en-3β-ol,
6α,17α,18-trimethyl-17β-(5',6'-dihydro-2H-pyran-4'-yloxy)-androst-4-en-3β-ol,
6α,18-dimethyl-17α-ethyl-17β-(5',6'-dihydro-2-pyran-4'-yloxy)androst-4-en-3β-ol,
6α,17α-dimethyl-17β-(5',6'-dihydro-2H-pyran-4'-yloxy)androst-4-en-3β-ol,
6α-methyl-17β-(5',6'-dihydro-2H-pyran-4'-yloxy)androst-4-en-3β-ol,
17β-(5',6'-dihydro-2H-pyran-4'-yloxy)androst-4-en-3-ol,
17β-(5',6'-dihydro-2H-pyran-4'-yloxy)-18-methylandrosta-4,6-dien-3β-ol,
17α,18-dimethyl-17β-(5',6'-dihydro-2H-pyran-4'-yloxy)-androsta-4,6-dien-3β-ol,
6α,17α,18-trimethyl-17β-(5',6'-dihydro-2H-pyran-4'-yloxy)androsta-4,6-dien-3β-ol,
6α,18-dimethyl-17α-ethyl-17β-(5',6'-dihydro-2H-pyran-4'-yloxy)androsta-4,6-dien-3β-ol,
6α,17α-dimethyl-17β-(5',6'-dihydro-2H-pyran-4'-yloxy)androsta-4,6-dien-3β-ol,
6α-methyl-17β-(5',6'-dihydro-2H-pyran-4'-yloxy)androsta-4,6-dien-3β-ol,
17β-(5',6'-dihydro-2H-pyran-4'-yloxy)-18-methyl-19-norandrost-4-en-3β-ol,
17α,18-dimethyl-17β-(5',6'-dihydro-2H-pyran-4'-yloxy)-19-norandrost-4-en-3β-ol,
6α,17α,18-trimethyl-17β-(5',6'-dihydro-2H-pyran-4'-yloxy)-19-norandrost-4-en-3β-ol,
6α,18-dimethyl-17α-ethyl-17β-(5',6'-dihydro-2H-pyran-4'-yloxy)-19-norandrost-4-en-3β-ol,
6α,17α-dimethyl-17β-(5',6'-dihydro-2H-pyran-4'-yloxy)-19-norandrost-4-en-3β-ol,
6α-methyl-17β-(5',6'-dihydro-2H-pyran-4'-yloxy)-19-norandrost-4-en-3β-ol,
17β-(5',6'-dihydro-2H-pyran-4'-yloxy)-19-norandrost-4-en-3β-ol,
17β-(5',6'-dihydro-2H-pyran-4'-yloxy)-18-methyl-19-norandrosta-4,6-dien-3β-ol,
17α,18-dimethyl-17β-(5',6'-dihydro-2H-pyran-4'-yloxy)-19-norandrosta-4,6-dien-3β-ol,
6α,17α,18-trimethyl-17β-(5',6'-dihydro-2H-pyran-4'-yloxy)-19-norandrosta-4,6-dien-3β-ol,
6α,18-dimethyl-17α-ethyl-17β-(5',6'-dihydro-2H-pyran-4'-yloxy)-19-norandrosta-4,6-dien-3β-ol,
6α,17α-dimethyl-17β-(5',6'-dihydro-2H-pyran-4'-yloxy)-19-norandrosta-4,6-dien-3β-ol,
6α-methyl-17β-(5',6'-dihydro-2H-pyran-4'-yloxy)-19-norandrosta-4,6-dien-3β-ol, and the like.

EXAMPLE 8

A mixture of 1 g. of 17β-(5',6'-dihydro-2H-pyran-4'-yloxy)-19-norandrost-4-en - 3β - ol, 4 ml. of pyridine, and 2 ml. of acetic anhydride is allowed to stand at room temperature for 15 hours. The mixture is then poured into ice water and the solid which forms is collected by filtration, washed with water, and dried to yield 3β-acetoxy-17β-(5',6'-dihydro-2H-pyran-4'-yloxy)-19-norandrost - 4-ene which may be further purified through recrystallization from acetone:hexane.

Similarly, repeating this procedure with other products of Example 7 yields the corresponding 3β-acetoxy derivatives, e.g., 3β-acetoxy-17α,18-dimethyl-17β-(5',6'-dihydro-2H-pyran-4'-yloxy)-19-norandrost-4-ene,
3β-acetoxy-17α-methyl-17β-(5',6'-dihydro-2H-pyran-4'-yloxy)androst-4-ene,
3β-acetoxy-17α-ethyl-17β-(5',6'-dihydro-2H-pyran-4'-yloxy)-18-methylandrost-4-ene, and the like.

EXAMPLE 9

Repeating the procedure of Example 7 but replacing:

17β-(5',6'-dihydro-2H-pyran-4'-yloxy)-19-norandrost - 4-en-3-one with 19-norandrost-4-en-17β-ol-3-one—19-norandrost - 4 - ene-3β,17β-diol is obtained.

A mixture of 1 g. of 19-norandrost-4-ene-3β,17β-diol, 4 ml. of pyridine, and 2 ml. of acetic anhydride is allowed to stand at room temperature for 15 hours. The mixture is then poured into ice water, and the solid which forms is collected by filtration, washed with water, and dried. The mixture is chromatographed on neutral alumina, eluting with ether:hexane, to yield 17β-acetoxy-19-norandrost-4-en-3β-ol.

Repeating this sequence of procedures with other 19-norandrost-4-en-17β-ol-3-ones, androst - 4 - en-17β-ol-3-ones, 19 - norandrosta - 4,6 - dien-17β-ol-3-ones, and androsta - 4,6 - dien - 17β-ol-3-ones having hydrogen, methyl, chloro, or fluoro groups at C–6α and/or C–6β (at C–6 with 4,6-dienes); hydrogen and lower alkyl groups at C–17α; and hydrogen or methyl groups at C–18 yields the corresponding 3β - hydroxy-17α-ester compounds, e.g., 17β-acetoxy-18-methylandrost-4-en-3β-ol,
17α,18-dimethyl-17β-acetoxyandrost-4-en-3β-ol,
17α-ethyl-17β-acetoxy-18-methylandrost-4-en-3β-ol,
17α-methyl-17β-acetoxyandrost-4-en-3β-ol,
17α-ethyl-17β-acetoxyandrost-4-en-3β-ol,
17β-acetoxyandrost-4-en-3β-ol,
17β-acetoxy-18-methylandrosta-4,6-dien-3β-ol,
17α,18-dimethyl-17β-acetoxyandrosta-4,6-dien-3β-ol,
17α-ethyl-17β-acetoxy-18-methylandrosta-4,6-dien-3β-ol,
17α-methyl-17β-acetoxyandrosta-4,6-dien-3β-ol,
17α-ethyl-17β-acetoxyandrosta-4,6-dien-3β-ol,
17β-acetoxyandrosta-4,6-dien-3β-ol, and the like.

EXAMPLE 10

Repeating the procedure of Example 1 but replacing 5α,19 - norandrost-17β-ol-3-one with 17β - acetoxy-19-norandrost - 4 - en-3β-ol—3β - (5′,6′-dihydro-2H-pyran-4′ - xyloxy)-17β-acetoxy-19-norandrost-4-ene is obtained. Similarly, substituting the other products of Example 9 in this procedure yields the corresponding 3β-ethers, e.g., 3β-(5′,6′-dihydro-2H-pyran-4′yloxy)-17β-acetoxy-18-methylandrost-4-ene,
3β-(5′,6′-dihydro-2H-pyran-4′-yloxy)-17α,18-dimethyl-17β-acetoxyandrost-4-ene,
3β-(5′,6′-dihydro-2H-pyran-4′-yloxy)-17α-ethyl-17β-acetoxy-18-methylandrost-4-ene,
3β-(5′,6′-dihydro-2H-pyran-4′-yloxy)-17α-methyl-17β-acetoxyandrost-4-ene,
3β-(5′,6′-dihydro-2H-pyran-4′-yloxy)-17α-ethyl-17β-acetoxyandrost-4-ene,
3β-(5′6′-dihydro-2H-pyran-4′-yloxy)-17β-acetoxyandrost-4-ene,
3β-(5′6′-dihydro-2H-pyran-4′-yloxy)-17β-acetoxyacetoxy-8-methylandrost-4,6-diene,
3β-(5′,6′-dihydro-2H-pyran-4′-yloxy)-17α,18-dimethyl-17β-acetoxyandrosta-4,6-diene,
3β-(5′,6′-dihydro-2H-pyran-4′-yloxy)-17α-ethyl-17β-acetoxy-18-methylandrosta-4,6-diene,
3β-(5′,6′-dihydro-2H-pyran-4′-yloxy)-17α-methyl 17β-acetoxyandrosta-4,6-diene,
3β-(5′,6′-dihydro-2H-pyran-4′-yloxy)-17α-ethyl-17β-acetoxyandrosta-4,6-diene,
3β-(5′,6′-dihydro-2H-pyran-4′-yloxy)-17β-acetoxyandrosta-4,6-diene,
3β-(5′,6′-dihydro-2H-pyran-4′-yloxy)-17β-acetoxy-18-methyl-19-norandrost-4-ene,
3β-(5′,6′-dihydro-2H-pyran-4′-yloxy)-17α,18-dimethyl-17β-acetoxy-19-norandrost-4-ene,
3β-(5′,6′-dihydro-2H-pyran-4′-yloxy)-17α-ethyl-17β-acetoxy-18-methyl-19-norandrost-4-ene,
3β-(5′,6′-dihydro-2H-pyran-4′-yloxy)-17α-methyl-17β-acetoxy-19-norandrost-4-ene,
3β-(5′,6′-dihydro-2H-pyran-4′-yloxy)-17α-ethyl-17β-acetoxy-19-norandrost-4-ene,
3β-(5′,6′-dihydro-2H-pyran-4′-yloxy)-17β-acetoxy-19-norandrost-4-ene,
3β-(5′,6′-dihydro-2H-pyran-4′-yloxy)-17β-acetoxy-18-methyl-19-norandrosta-4,6-diene,
3β-(5′,6′-dihydro-2H-pyran-4′-yloxy)-17α,18-dimethyl-17β-acetoxy-19-norandrosta-4,6-diene,
3β-(5′,6′-dihydro-2H-pyran-4′-yloxy)-17α-ethyl-17β-acetoxy-18-methyl-19-norandrosta-4,6-diene,
3β-(5′,6′-dihydro-2H-pyran-4′-yloxy)-17α-methyl-17β-acetoxy-19-norandrosta-4,6-diene,
3β-(5′,6′-dihydro-2H-pyran-4′-yloxy)-17α-ethyl-17β-acetoxy-19-norandrosta-4,6-diene,
3β-(5′,6′-dihydro-2H-pyran-4′-yloxy)-17β-acetoxy-19-norandrosta-4,6-diene, and the like.

EXAMPLE 11

A solution of 1 g. of 3β-(5′,6′-dihydro-2H-pyran-4′-yloxy) - 17α-methyl-17β-acetoxy-19-norandrost - 4 - ene in 50 ml. of methanol is heated at reflux for three hours with a solution of potassium hydroxide in 1 ml. of water. The reaction mixture is then poured into ice water and the solid which forms is collected by filtration, washed with water to neutrality, and dried to yield 3β-(5′,6′ - dihydro - 2H-pyran-4′-yloxy)-17α-methyl-19-norandrost - 4-en-17β-ol which is recrystallized from methylene chloride:ether.

Similarly, the other 17β-ester products of Example 10 are converted to the corresponding 17β-ols by this procedure.

EXAMPLE 12

Repeating the procedure of Example 7 but replacing 17α - ethynyl - 17β-(5′,6′-dihydro-2H-pyran-4′-yloxy)-19 - norandrost-4-en-3-one with 17α - methyl - 19-norandrost-4 - en-17β-ol--3-one—17α-methyl-19-norandrost-4-ene-3β,17β-diol is obtained. Then repeating the procedure of Example 1 but replacing 5α,19-norandrost-17β-ol-3-one with 17α - methyl - 19-norandrost-4-en-3β,17β-diol and using 4 ml. instead of 2 ml. of 4′-methoxy-5′,6′-dihydro-2H-pyran—3β,17β-bis(5′,6′ - dihydro-2H-pyran-4′-yloxy)-17α-methyl-19-norandrost-4-ene is obtained.

Repeating this sequence of procedures with other 19-norandrost - 4 - en-17β-ol-3-ones, androst - 4 - en-17β-ol-3-ones, 19 - norandrosta-4,6-dien-17β-ol-3-ones, and androsta - 4,6-diene-17β-ol-3-ones having hydrogen, methyl, chloro, or fluoro groups at C–6α and/or C–6β positions (at C–6 with 4,6-dienes); hydrogen and lower alkyl groups at C–17α; and hydrogen or methyl at C–18 yields the corresponding 3β,17β-bisethers, e.g., 3β,17β-bis(5′,6′-dihydro - 2H - pyran - 4′-yloxy)-17α-methylandrost-4-ene, 3β,17β - bis(5′,6′-dihydro - 2H-pyran-4′-yloxy)-17α,18-dimethyl-19-norandrost-4-ene, and the like.

EXAMPLE 13

Repeating the procedure of Example 1 but replacing 5α,19-norandrost-17β-ol-3-one with 19 - norandrosta-4,9-(10) - dien-17β-ol-3-one—17β-(5′,6′-dihydro-2H-pyran-4′-yloxy)-19-norandrosta-4,9(10)-dien-3-one is obtained.

Similarly, repeating this procedure with other 19-norandrosta-4,9(10)-dien-17β-ol - 3 - ones and 19-norandrosta-4,9(10),11-trien-17β-ol-3-ones having hydrogen and lower alkyl groups at C-17α yields the corresponding 17β-(5′,6′-dihydro-2H-pyran-4′-yloxy) compounds, e.g., 17α-propyl-17β-(5′,6′-dihydro-2H-pyran-4′-yloxy)-18-methyl-19-norandrosta-4,9(10)-dien-3-one,
17β-(5′,6′-dihydro-2H-pyran-4′-yloxy)-19-norandrosta-4,9(10)-dien-3-one,
17β-(5′,6′-dihydro-2H-pyran-4′-yloxy)-18-methyl-19-norandrosta-4,9(10)-dien-3-one,
17α-methyl-17β-(5′,6′-dihydro-2H-pyran-4′-yloxy)-19-norandrosta-4,9(10)-dien-3-one,
17α,18-dimethyl-17β-(5′,6′-dihydro-2H-pyran-4′-yloxy)-19-norandrosta-4,9(10)-dien-3-one,
17α-ethyl-17β-(5′,6′-dihydro-2H-pyran-4′-yloxy)-19-norandrosta-4,9(10)-dien-3-one,
17α-ethyl-17β-(5′,6′-dihydro-2H-pyran-4′-yloxy)-18-methyl-19-norandrosta-4,9(10)-dien-3-one,
17β-(5′,6′-dihydro-2H-pyran-4′-yloxy)-18-methyl-19-norandrosta-4,9(10),11-trien-3-one,
17β-(5′,6′-dihydro-2H-pyran-4′-yloxy)-19-norandrosta-4,9(10),11-trien-3-one,
17α-methyl-17β-(5′,6′-dihydro-2H-pyran-4′-yloxy)-19-norandrosta-4,9(10),11-trien-3-one,
17α,18-dimethyl-17β-(5′,6′-dihydro-2H-pyran-4′-yloxy)-19-norandrosta-4,9(10),11-trien-3-one,
17α-ethyl-17β-(5′,6′-dihydro-2H-pyran-4′-yloxy)-18-methyl-19-norandrosta-4,9(10),11-trien-3-one,
17α-ethyl-17β-(5′,6′-dihydro-2H-pyran-4′-yloxy)-19-norandrosta-4,9(10),11-trien-3-one,
17α-propyl-17β-(5′,6′-dihydro-2H-pyran-4′-yloxy)-18-methyl-19-norandrosta-4,9(10),11-trien-3-one,
17α-propyl-17β-(5′,6′-dihydro-2H-pyran-4′-yloxy)-19-norandrosta-4,9(10),11-trien-3-one, and the like.

EXAMPLE 14

A solution of 1 g. of 17β-(5′,6′-dihydro-2H-pyran-4′-yloxy)-19-norandrosta-4,9(10)-dien-3-one in 50 ml. of tetrahydrofuran is added over a 30-minute period to a stirred suspension of 1 g. of lithium tri-t-butoxy aluminum hydride in 50 ml. of anhydrous tetrahydrofuran and this mixture is heated at reflux for two hours. To the mixture are cautiously added 5 ml. of ethylacetate and 2 ml. of water. Sodium sulfate is next added, the mixture is filtered, and the solid thus collected is washed with hot ethylacetate. The combined organic solutions are then evaporated to yield 17β-(5′,6′-dihydro-2H-pyran-4′-yloxy)-19-norandrosta-4,9(10)-dien-3β-ol which may be further purified through recrystallization from acetone:hexane.

Similarly, repeating this procedure with other products of Example 13 yields the corresponding 3β-hydroxy derivatives, e.g., 17α-propyl-17β-(5',6'-dihydro-2H-pyran-4'-yloxy)-18-methyl-19-norandrosta-4,9(10)-dien-3β-ol,
17β-(5',6'-dihydro-2H-pyran-4'-yloxy)-19-norandrosta-4,9(10)-dien-3β-ol,
17β-(5',6'-dihydro-2H-pyran-4'-yloxy)-18-methyl-19-norandrosta-4,9(10)-dien-3β-ol,
17α-methyl-17β-(5'6'-dihydro-2H-pyran-4'-yloxy)-19-norandrosta-4,9(10)-dien-3β-ol,
17α,18-dimethyl-17β-(5',6'-dihydro-2H-pyran-4'-yloxy)-19-norandrosta-4,9(10)-dien-3β-ol,
17α-ethyl-17β-(5'6'-dihydro-2H-pyran-4'-yloxy)-19-norandrosta-4,9(10)-dien-3β-ol,
17α-ethyl-17β-(5'6'-dihydro-2H-pyran-4'-yloxy)-18-methyl-19-norandrosta-4,9(10)-dien-3β-ol,
17β-(5',6'-dihydro-2H-pyran-4'-yloxy)-18-methyl-19-norandrosta-4,9(10),11-trien-3β-ol,
17β-(5',6'-dihydro-2H-pyran-4'-yloxy)-19-norandrosta-4,9(10),11-trien-3β-ol,
17α-methyl-17β-(5',6'-dihydro-2H-pyran-4'-yloxy)-19-norandrosta-4,9(10),11-trien-3β-ol,
17α,18-dimethyl-17β-(5',6'-dihydro-2H-pyran-4'-yloxy)-19-norandrosta-4,9(10),11-trien-3β-ol,
17α-ethyl-17β-(5',6'-dihydro-2H-pyran-4'-yloxy)-18-methyl-19-norandrosta-4,9(10),11-trien-3β-ol,
17α-ethyl-17β-(5',6'-dihydro-2H-pyran-4'-yloxy)-19-norandrosta-4,9(10),11-trien-3β-ol,
17α-propyl-17β-(5',6'-dihydro-2H-pyran-4'-yloxy)-18-methyl-19-norandrosta-4,9(10),11-trien-3β-ol,
17α-propyl-17β-(5',6'-dihydro-2H-pyran-4'-yloxy)-19-norandrosta-4,9(10),11-trien-3β-ol, and the like.

EXAMPLE 15

A mixture of 1 g. of 17β-(5',6'-dihydro-2H-pyran-4'-yloxy) - 19 - norandrosta - 4,9(10) - dien-3β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3β-acetoxy - 17β - (5',6'-dihydro-2H-pyran-4'-yloxy)-19-norandrosta-4,9(10)-diene which may be further purified through recrystallization from acetone:hexane.

Similarly, repeating this procedure with other products of Example 14 yields the corresponding 3β-acetoxy derivatives, e.g., 3β-acetoxy-17α,18-dimethyl-17β-(5',6'-dihydro-2H-pyran-4'-yloxy)-19-norandrosta-4,9(10)-dien,
3β-acetoxy-17α-ethyl-17β-(5',6'-dihydro-2H-pyran-4'-yloxy)-19-norandrosta-4,9(10)-dien,
3β-acetoxy-17α-propyl-17β-(5',6'-dihydro-2H-pyran-4'-yloxy)-18-methyl-19-norandrosta-4,9(10),11-triene, and the like.

EXAMPLE 16

Repeating the procedure of Example 14 but replacing: 17β-(5',6'-dihydro-2H-pyran-4'-yloxy) - 19-norandrost-4-en-3-one with 19-norandrosta-4,9(10)-dien - 17β - ol-3-one—19-norandrosta - 4,9(10)-diene-3β,17β-diol is obtained.

A mixture of 1 g. of 19-norandrosta-4,9(10)-diene-3β,17β-diol, 4 ml. of pyridine, and 2 ml. of acetic anhydride is allowed to stand at room temperature for 15 hours. The mixture is then poured into ice water, and the solid which forms is collected by filtration, washed with water, and dried. The mixture is chromatographed on neutral alumina, eluting with ether:hexane, to yield 17β-acetoxy-19-norandrosta-4,9(10)-dien-3β-ol.

Repeating this sequence of procedures with other 19-norandrosta - 4,5(10) - dien - 17β - ol - 3 - ones and 19-norandrosta - 4,5(10),11 - trien - 17β - ol - 3 - ones having hydrogen and lower alkyl groups at C–17α and hydrogen or methyl groups at C–18 yields the corresponding 3β-hydroxy-17α-ester compounds, e.g., 17α-propyl-17β-acetoxy-18-methyl-19-norandrosta-4,9(10)-dien-3β-ol,
17β-acetoxy-19-norandrosta-4,9(10)-dien-3β-ol,
17β-acetoxy-18-methyl-19-norandrosta-4,9(10)-dien-3β-ol,
17α-methyl-17β-acetoxy-19-norandrosta-4,9(10)-dien 3β-ol,
17α,18-dimethyl-17β-acetoxy-19-norandrosta-4,9(10)-dien-3β-ol,
17α-ethyl-17β-acetoxy-19-norandrosta-4,9(10)-dien-3β-ol,
17α-ethyl-17β-acetoxy-18-methyl-19-norandrosta-4,9(10)-dien-3β-ol,
17β-acetoxy-18-methyl-19-norandrosta-4,9(10),11-trien-3β-ol,
17β-acetoxy-19-norandrosta-4,9(10),11-trien-3β-ol,
17α-methyl-17β-acetoxy-19-norandrosta-4,9(10),11-trien-3β-ol,
17α,18-dimethyl-17β-acetoxy-19-norandrosta-4,9(10),11-trien-3β-ol,
17α-ethyl-17β-acetoxy-18-methyl-19-norandrosta-4,9(10),11-trien-3β-ol,
17α-ethyl-17β-acetoxy-19-norandrosta-4,9(10),11-trien-3β-ol, and the like.

EXAMPLE 17

Repeating the procedure of Example 1 but replacing 5α,19 - norandrost - 17β - ol - 3 - one with 17β - acetoxy-19 - norandrosta - 4,9(10) - dien - 3β - ol—3β - (5',6'-dihydro - 2H - pyran - 4' - yloxy) - 17β - acetoxy - 19-norandrosta - 4,9(10) - diene is obtained. Similarly, substituting the other products of Example 16 in this procedure, the corresponding 3β-ethers are obtained, e.g., 3β - (5',6' - dihydro - 2H - pyran - 4' - yloxy) - 17α-propyl - 17β - acetoxy - 18 - methyl - 19 - norandrosta-4,9(10)-diene,
3β - (5',6' - dihydro - 2H - pyran - 4' - yloxy) - 17β-acetoxy-19-norandrosta-4,9(10)-diene,
3β - (5',6' - dihydro - 2H pyran - 4' - yloxy) - 17β - acetoxy-18-methyl-19-norandrosta-4,9(10)-diene,
3β (5',6' - dihydro - 2H - pyran - 4' - yloxy) - 17α-methyl-17β-acetoxy-19-norandrosta-4,9(10)-diene,
3β - (5',6' - dihydro - 2H - pyran - 4' - yloxy) - 17α,18-dimethyl-17β-acetoxy-19-norandrosta-4,9(10)-diene,
3β - (5',6' - dihydro - 2H - pyran - 4' - yloxy) - 17α-ethyl-17β-acetoxy-19-norandrosta-4,9(10)-diene,
3β - (5',6' - dihydro - 2H - pyran - 4' - yloxy) - 17α-ethyl - 17β - acetoxy - 18 - methyl - 19 - norandrosta-4,9(10)-diene,
3β - (5',6' - dihydro - 2H - pyran - 4' - yloxy) - 17β-acetoxy - 18 - methyl - 19 - norandrosta - 4,9(10),11-triene,
3β - (5',6' - dihydro - 2H - pyran - 4' - yloxy) - 17β-acetoxy-19-norandrosta-4,9(10),11-triene,
3β - (5',6' - dihydro - 2H - pyran - 4' - yloxy) - 17α-methyl - 17β - acetoxy - 19 - norandrosta - 4,9(10),11-triene,
3β - (5',6' - dihydro - 2H - pyran - 4' - yloxy) - 17α,18-dimethyl - 17β - acetoxy - 19 - norandrosta - 4,9(10),11-triene,
3β - (5',6' - dihydro - 2H - pyran - 4' - yloxy) - 17α-ethyl - 17β - acetoxy - 18 - methyl - 19 - norandrosta-4,9(10),11-triene,
3β - (5',6' - dihydro - 2H - pyran - 4' - yloxy) - 17α-ethyl - 17β - acetoxy - 19 - norandrosta - 4,9(10),11-triene, and the like.

EXAMPLE 18

A solution of 1 g. of 3β-(5',6'-dihydro-2H-pyran-4'-yloxy) - 17α - ethyl - 17β - acetoxy - 19 - norandrosta-4,9(10)-diene in 50 ml. of methanol is heated at reflux for three hours with a solution of potassium hydroxide in 1 ml. of water. The reaction mixture is then poured into ice water and the solid which forms is collected by filtration, washed with water to neutrality, and dried to

17 yield 3β - (5,6' - dihydro - 2H - pyran - 4' - yloxy) - 17α-ethyl - 19 - norandrosta - 4,9(10) - dien - 17β - ol which is recrystallized from methylene chloride: ether.

Similarly, the other 17β-ester products of Example 17 are converted to the corresponding 17β-ols by this procedure, e.g., 3β - (5',6' - dihydro - 2H - pyran - 4' - yloxy)-17α - methyl - 19 - norandrosta - 4,9(10),11 - trien - 17β-ol, etc.

EXAMPLE 19

Repeating the procedure of Example 14 but replacing 17β - (5',6' - dihydro - 2H - pyran - 4' - yloxy) - 19-norandrosta - 4,9(10) - dien - 3 - one with 19 - norandrosta - 4,9(10) - diene - 17β - ol - 3 - one—19-norandrosta-4,9(10)-diene-3β,17β-diol is obtained. Then repeating the procedure of Example 1 but replacing 5α,19-norandrosta-17β - ol - 3 - one with 19 - norandrosta - 4,9(10) - diene-3β,17β-diol and using 4 ml. instead of 2 ml. of 4'-methoxy - 5',6' - dihydro - 2H - pyran—3β,17β-bis(5',6'-dihydro - 2H - pyran - 4' - yloxy) - 19 - norandrosta-4,9(10)-diene is obtained.

Repeating this sequence of procedures with other 19-norandrosta - 4,9(10) - dien - 17β - ol - 3 - ones and 19-norandrosta - 4,9(10),11 - trien - 17β - ol - 3 - ones having hydrogen and lower alkyl (e.g. methyl, ethyl) groups at C-17α and hydrogen or methyl at C-18 yields the corresponding 3β,17β - bisethers, e.g., 3β,17β - bis - (5',6' - dihydro - 2H - pyran - 4' - yloxy) - 17α - methylandrosta-4,9(10) - diene, 3β,17β - bis(5',6' - dihydro - 2H - pyran-4' - yloxy) - 17α,18 - dimethyl - 19 - norandrosta - 4,9(10),11-triene, and the like.

The invention claimed is:

1. A 5',6'-dihydro-2H-pyran-4'-yl steroid ether selected from the group consisting of:
(a) a member selected from the group consisting of 17β - (5',6' - dihydro - 2H - pyran - 4' - yloxy) - 5α-androstan-3-ones and 17β-(5',6'-dihydro-2H-pyran-4'-yloxy)-5α,19-norandrostan-3-ones having at positions C-2α and C-4α, members selected from the group consisting of hydrogen and methyl, and at position C-17α, members selected from the group consisting of hydrogen and lower alkyl;
(b) a member selected from the group consisting of 17β - (5',6' - dihydro - 2H - pyran - 4' - yloxy) androst-4-en-3-ones and 17β-(5',6'-dihydro-2H-pyran-4'-yloxy)-19-norandrost-4-en-3-ones having at position C-4α, a member selected from the group consisting of hydrogen and chloro; at position C-7α, a member selected from the group consisting of hydrogen, methyl, fluoro, and chloro; and at position C-17α, a member selected from the group consisting of hydrogen and lower alkyl;
(c) a member selected from the group consisting of 17β - (5',6' - dihydro - 2H - pyran - 4' - yloxy) androsta-3,5-dienes and 17β-(5',6'-dihydro-2H-pyran-4'-yloxy)-19-norandrosta-3,5-dienes having at position C-3, a member selected from the group consisting of lower alkoxy and lower cycloalkoxy; at position C-17α, a member selected from the group consisting of hydrogen and lower alkyl; and at C-18, a member selected from the group consisting of hydrogen and methyl;
(d) a 17β-(5',6'-dihydro-2H-pyran-4'-yloxy)-5α-androst-1-en-3-one having at positions C-1 and C-2, members selected from the group consisting of hydrogen and methyl, at least one of said members at C-1 and C-2 being methyl; and at position C-17α, a member selected from the group consisting of hydrogen and lower alkyl;
(e) a member selected from the group consisting of androst-4-enes and 19-norandrost-4-enes having at position C-3, a member selected from the group consisting of keto, hydrogen, hydroxy, conventional hydrolyzable esters of said hydroxy and 5',6'-dihydro-2H-pyran-4'-yloxy; between positions C-6 and C-7, a bond selected from the group consisting of single and double bonds; at position C-6, first and second members selected from the group consisting of hydrogen, methyl, fluoro, and chloro, said second member being present only when the bond between C-6 and C-7 carbons is a single bond; at position C-17α, a member selected from the group consisting of hydrogen and lower alkyl; at position C-17β, a member selected from the group consisting of hydroxy, conventional hydrolyzable esters of said hydroxy, and 5',6'-dihydro-2H-pyran-4'-yloxy and at least one of said C-3 and C-17β positions having said 5',6'-dihydro-2H-pyran-4'-yloxy group; and at position C-18, a member selected from the group consisting of hydrogen and methyl;
(f) a 19-norandrosta-4,9(10)-diene having at position C-3, a member selected from the group consisting of keto, hydrogen, hydroxy, conventional hydrolyzable esters of said hydroxy, and 5',6'-dihydro-2H-pyran-4'-yloxy between carbons at C-11 and C-12, a member selected from the group consisting of single and double bonds; at position C-17α, a member selected from the group consisting of hydrogen and lower alkyl; at position C-17β, a member selected from the group consisting of hydroxy, conventional hydrolyzable esters of said hydroxy, and 5',6'-dihydro-2H-pyran-4'-yloxy and at least one of said C-3 and C-17β positions having said 5',6'-dihydro-2H-pyran-4'-yloxy; and at position C-18, a member selected from the group consisting of hydrogen and methyl.

2. The steroid ether of claim 1 wherein the ether is a member selected from the group consisting of 17β-(5',6'-dihydro-2H-pyran-4'-yloxy)-5α-androstan-3-ones and 17β-(5',6' - dihydro - 2H - pyran - 4' - yloxy) - 5α,19 - norandrostan-3-ones having at positions C-2α and C-4α, members selected from the group consisting of hydrogen and methyl, and at position C-17α, a member selected from the group consisting of hydrogen and lower alkyl.

3. The steroid ether of claim 2 wherein the ether is 2α - methyl - 17β - (5',6' - dihydro - 2H - pyran-4'-yloxy)-5α-androstan-3-one.

4. The steroid ether of claim 2 wherein the ether is 4α - methyl - 17β - (5',6' - dihydro - 2H - pyran-4'-yloxy)-5α-androstan-3-one.

5. The steroid ether of claim 1 wherein the ether is a member selected from the group consisting of 17β-(5',6'-dihydro-2H-pyran-4'-yloxy)androst-4-en-3-ones and 17β-(5',6'-dihydro - 2H - pyran - 4' - yloxy) - 19 - norandrost-4-en-3-ones having at position C-4α, a member selected from the group consisting of hydrogen or chloro; at position C-7α, a member selected from the group consisting of hydrogen, methyl, fluoro, and chloro; and at position C-17α, a member selected from the group consisting of hydrogen and lower alkyl.

6. The steroid ether of claim 5 wherein the ether is 17β-(5',6'-dihydro-2H-pyran-4'-yloxy)androst-4-en-3-one.

7. The steroid ether of claim 5 wherein the ether is 4 - chloro - 17β - (5',6' - dihydro - 2H - pyran - 4' - yloxy) androst-4-en-3-one.

8. The steroid ether of claim 5 wherein the ether is 7α,17α - dimethyl - 17β - (5',6' - dihydro - 2H - pyran - 4'-yloxy)-19-norandrost-4-en-3-one.

9. The steroid ether of claim 5 wherein the ether is 17β - (5',6' - dihydro - 2H - pyran - 4' - yloxy) - 19 - norandrost-4-en-3-one.

10. The steroid ether of claim 5 wherein the ether is 4-chloro - 17β - (5',6' - dihydro-2H-pyran-4'-yloxy)-19-norandrost-4-en-3-one.

11. The steroid ether of claim 5 wherein the ether is 7α-methyl - 17β - (5',6' - dihydro-2H-pyran-4'-yloxy)-19-norandrost-4-en-3-one.

12. The steroid ether of claim 1 wherein the ether is a member selected from the group consisting of 17β-(5',6'-dihydro-2H-pyran - 4' - yloxy)androsta - 3,5-dienes and 17β-(5',6'-dihydro - 2H-pyran-4'-yloxy)-19-norandrosta-3,5-dienes having at position C–3, a member selected from the group consisting of lower alkoxy and lower cycloalkoxy; at position C–17α, a member selected from the group consisting of hydrogen and lower alkyl; and at C–18, a member selected from the group consisting of hydrogen and methyl.

13. The steroid ether of claim 12 wherein the ether is 3-cyclopentoxy-17α-methyl - 17β - (5′,6′ - dihydro-2H-pyran-4′-yloxy)-19-norandrosta-3,5-diene.

14. The steroid ether of claim 12 wherein the ether is 3 - cyclopentoxy - 17α,18 - dimethyl-17β-(5′,6′-dihydro-2H-pyran-4′-yloxy)-19-norandrosta-3,5-diene.

15. The steroid ether of claim 12 wherein the ether is 3-methoxy-17α,18-dimethyl-17β - (5′,6′ - dihydro - 2H-pyran-4′-yloxy)-19-norandrosta-3,5-diene.

16. The steroid ether of claim 1 wherein the ether is a 17β - (5′,6′ - dihydro-2H-pyran - 4′ - yloxy) - 5α - androst-1-en-3-one having at positions C–1 and C–2, members selected from the group consisting of hydrogen and methyl, at least one of said members at C–1 and C–2 being methyl and at a position C–17α, a member selected from the group consisting of hydrogen and lower alkyl.

17. The steroid ether of claim 16 wherein the ether is 1-methyl - 17β - (5′,6′-dihydro - 2H - pyran-4′-yloxy)4α-androst-1-en-3-one.

18. The steroid ether of claim 16 wherein the ether is 2-methyl-17β-(5′,6′-dihydro - 2H - pyran - 4′ - yloxy)-5α-androst-1-en-3-one.

19. The steroid ether of claim 16 wherein the ether is 2,17α-dimethyl - 17β-(5′,6′ - dihydro-2H-pyran-4′-yloxy)-5α-androst-1-en-3-one.

20. The steroid ether of claim 1 wherein the ether is selected from the group consisting of androst-4-enes and 19-norandrost-4-enes having at position C–3, a member selected from the group consisting of keto, hydrogen, hydroxy, conventional hydrolyzable esters of said hydroxy and 5′,6′-dihydro-2H-pyran-4′-yloxy; between positions C–6 and C–7, a bond selected from the group consisting of single and double bonds; at position C–6, first and second members selected from the group consisting of hydrogen, methyl, fluoro, and chloro, said second member being present only when the bond between the C–6 and C–7 carbons is a single bond; at C–17α, a member selected from the group consisting of hydrogen and lower alkyl; at C–17β, a member selected from the group consisting of hydroxy, conventional hydrolyzable esters of said hydroxy, and 5′,6′-dihydro-2H-pyran-4′-yloxy and at least one of said C-3 and C–17β positions having said 5′,6′-dihydro-2H-pyran-4′-yloxy group; and at position C–18, a member selected from the group consisting of hydrogen and methyl groups.

21. The steroid ether of claim 20 wherein the ether is 17α-methyl - 17β-(5′,6′ - dihydro-2H-pyran - 4′ - yloxy)-19-norandrost-4-en-3-one.

22. The steroid ether of claim 20 wherein the ether is 3β - acetoxy - 17α-methyl - 17β - (5′,6′-dihydro-2H-pyran-4′-yloxy)-19-norandrost-4-ene.

23. The steroid ether of claim 20 wherein the ether is 17α,18-dimethyl-17β-(5′,6′-dihydro-2H-pyran - 4′-yloxy)-19-norandrost-4-en-3-one.

24. The steroid ether of claim 20 wherein the ether is 3-acetoxy-17α,18 - dimethyl - 17β - (5′,6′-dihydro-2H-pyran-4′-yloxy)-19-norandrost-4-ene.

25. The steroid ether of claim 20 wherein the ether is 6α-fluoro-17α -methyl - 17β-(5′,6′ - dihydro-2H-pyran-4′-yloxy)-19-norandrost-4-en-3-one.

26. The steroid ether of claim 20 wherein the ether is 6α-fluoro-17α,18 - dimethyl - 17β-(5′,6′ - dihydro-2H-pyran-4′-yloxy)-19-norandrost-4-en-3-one.

27. The steroid ether of claim 20 wherein the ether is 6α,17α-dimethyl-17β-(5′,6′-dihydro-2H-pyran - 4′-yloxy)-19-norandrosta-4,6-dien-3-one.

28. The steroid ether of claim 20 wherein the ether is 6α,18-dimethyl-17αethyl-17β-(5′,6′-dihydro-2H-pyran - 4′-yloxy)-19-norandrosta-4,6-dien-3-one.

29. The steroid ether of claim 20 wherein the ether is 3-(5′,6′-dihydro-2H-pyran-4′-yloxy) - 17α - methyl-19-norandrost-4-en-17β-ol.

30. The steroid ether of claim 20 wherein the ether is 3-(5′,6′-dihydro-2H-pyran-4′-yloxy)-17α-methyl - 17β-acetoxy-19-norandrost-4-ene.

31. The steroid ether of claim 20 wherein the ether is 3,17β-bis(5′,6′-dihydro-2H-pyran-4′-yloxy)-17α-methyl-19-norandrost-4-ene.

32. The steroid ether of claim 1 wherein the ether is a 19-norandrosta-4,9(10)-diene having at position C–3, a member selected from the group consisting of keto, hydrogen, hydroxy, conventional hydrolyzable esters of said hydroxy, and 5′,6′-dihydro-2H-pyran-4′-yloxy; between carbons at C–11 and C–12, a member selected from the group consisting of single and double bonds; at position C–17α, a member selected from the group consisting of hydrogen and lower alkyl; at position C–17β, a member selected from the group consisting of hydroxy, conventional hydrolyzable esters of said hydroxy, and 5′,6-dihydro-2H-pyran-4′-yloxy, and at least one of said C–3 and C–17β positions having said 5′,6′-dihydro-2H-pyran-4′-yloxy group; and at position C–18, a member selected from the group consisting of hydrogen and methyl.

33. The steroid ether of claim 32 wherein the ether is 3β-(5′,6′-dihydro-2H-pyran-4′-yloxy) - 17α - ethyl - 19-norandrosta-4,9(10)-dien-17β-ol.

34. The steroid ether of claim 32 wherein the ether is 17β-(5′,6′-dihydro-2H-pyran-4′-yloxy) - 19 - norandrosta-4,9(10),11-trien-3-one.

35. The steroid ether of claim 32 wherein the ether is 17α - methyl - 17β-(5′,6′ - dihydro - 2H - pyran-4′-yloxy)-19-norandrosta-4,9(10),11-trien-3-one.

36. The steroid ether of claim 32 wherein the ether is 3β-(5′,6′-dihydro-2H-pyran-4′-yloxy)-17α - methyl-19-norandrosta-4,9(10),11-trien-17β-ol.

References Cited

UNITED STATES PATENTS

| | | | |
|---|---|---|---|
| 3,294,786 | 12/1966 | Cross et al. | 260—239.55 |
| 3,313,808 | 4/1967 | de Ruggieri et al. | 260—239.55 |
| 3,326,903 | 6/1967 | Klimstra | 260—239.55 |
| 3,338,925 | 8/1967 | Fried | 260—397.4 |
| 3,352,853 | 11/1967 | Klimstra | 260—239.55 |

HENRY A. FRENCH, Primary Examiner

U.S. Cl. X.R.

260—397.4, 397.5, 397.45, 999

UNITED STATES PATENT OFFICE
CERTIFICATE OF CORRECTION

Patent No. 3,525,740                    Dated August 25, 1970

Inventor(s) Alexander D. Cross and John A. Edwards

It is certified that error appears in the above-identified patent and that said Letters Patent are hereby corrected as shown below:

Column 1, line 20, "731,000" should read -- 731,300 --.
Column 2, lines 1-11, that portion of Formula (V) reading " 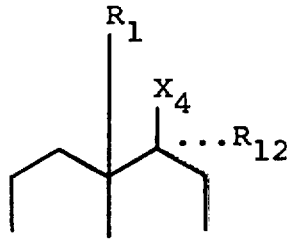 " should be -- 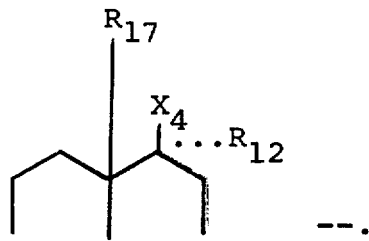 --.

Column 4, lines 60-72, that portion of the Formula (XVIII) reading

" 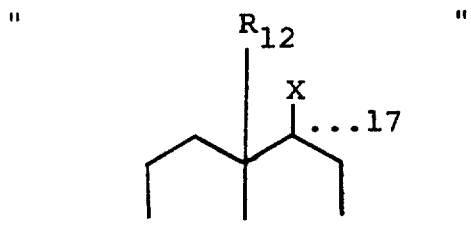 " should be -- 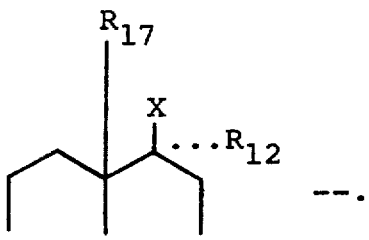 --.

Column 9, line 60, "yloxy,-" should read -- yloxy)- --.
Column 10, line 33, "4,6-17β-" should read -- 4,6-dien-17β- --.
Column 13, line 5, "xyloxy" should read -- yloxy --; and line 21, "acetoxy-8-methylandrost" should read -- 18-methylandrosta --.
Column 19, line 24, "4α" should read -- 5α --.
Column 20, line 32, "5',6" should read -- 5',6' --.

Signed and sealed this 18th day of July 1972.

(SEAL)
Attest:

EDWARD M. FLETCHER, JR.                 ROBERT GOTTSCHALK
Attesting Officer                       Commissioner of Patents